United States Patent [19]

Bost

[11] Patent Number: 4,887,723

[45] Date of Patent: Dec. 19, 1989

[54] ANTI-FRICTION SORTING ROLL AND STABILIZER

[76] Inventor: John R. Bost, P.O. Box 902, Laurens, S.C. 29671

[21] Appl. No.: 27,002

[22] Filed: Mar. 17, 1987

[51] Int. Cl.$^4$ .......................... B07C 5/06; F16C 32/06
[52] U.S. Cl. ..................................... 209/670; 209/673; 384/99; 384/114; 384/116
[58] Field of Search ............... 209/667, 668, 670, 673; 384/114, 116, 99, 119, 256, 257, 192; 29/116 AB

[56] References Cited

U.S. PATENT DOCUMENTS

| | | | |
|---|---|---|---|
| 3,697,142 | 10/1972 | Fortier | 384/99 |
| 3,703,322 | 11/1973 | Gustafsson | 384/116 |
| 3,994,397 | 11/1976 | Christ | 29/116 AD |
| 4,128,282 | 12/1978 | Bost | 209/673 |
| 4,172,527 | 10/1979 | Bost | 209/668 |
| 4,632,574 | 12/1986 | Wilson | 384/116 |
| 4,643,592 | 2/1987 | Lewis et al. | 384/114 |

FOREIGN PATENT DOCUMENTS

| | | | |
|---|---|---|---|
| 2434003 | 7/1977 | France | 384/119 |
| 160247 | 5/1933 | Switzerland | 384/257 |
| 626264 | 9/1978 | U.S.S.R. | 384/114 |
| 410961 | 5/1934 | United Kingdom | 384/116 |

*Primary Examiner*—Donald T. Hajec
*Attorney, Agent, or Firm*—Dority & Manning

[57] ABSTRACT

This invention relates to an apparatus for sorting round bearings according to their diameters, having a pair of elongated sorting cylinders which are supported on diverging longitudinal axes. Each of the cylinders are supported near each end of the cylinders by upper and lower bearing blocks which extend about a portion of the upper and lower circumference of the cylinders. The lower bearing block is provided with air under pressure for forming an air cushion between the curved surface of the bearing block and the circumferential surface of the cylinders to support the cylinder with little or no friction. Each of the sorting cylinders are also supported by a support shaft which extends beyond the ends of the cylinders. This shaft is supported by self-aligning bearings which, in turn, are supported by a stabilizer mechanism which permits limited vertical motion of the shaft and the cylinder. The shaft is permitted to rise vertically at a faster rate than it is permitted to fall vertically. The combination of the stabilizer and the air cushion bearings maintain the cylinder at a cooler and constant sorting temperature and permits sorting within an hour of start-up rather than having to wait for as long as twenty-four hours after start-up to begin to sort accurately.

16 Claims, 4 Drawing Sheets

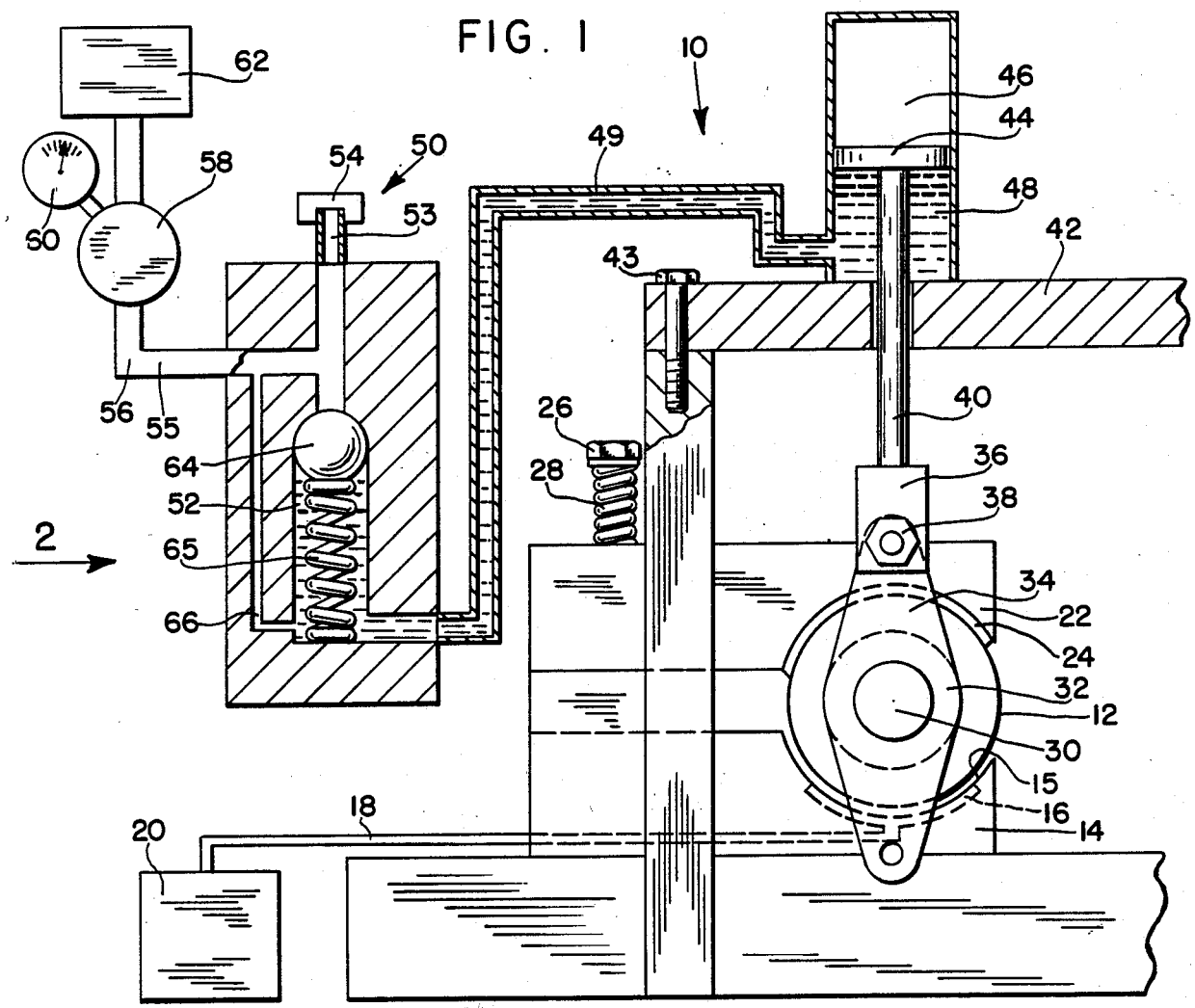
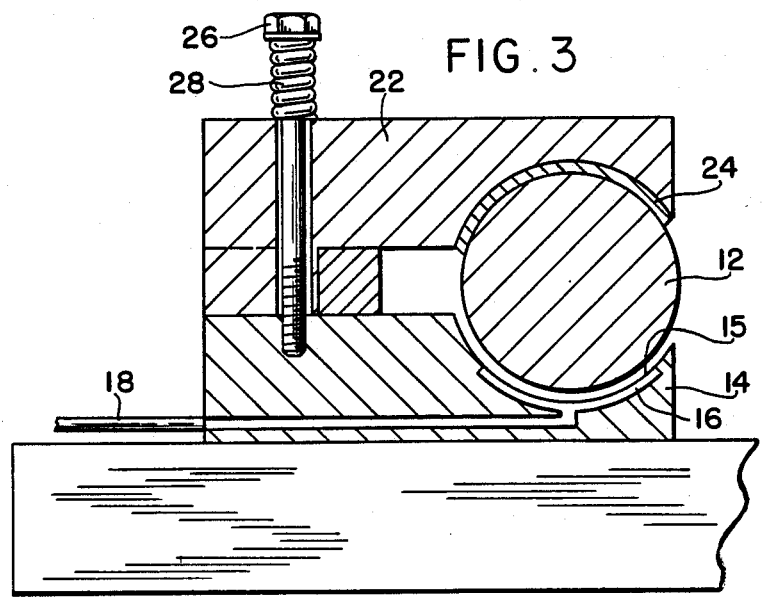

ANTI-FRICTION SORTING ROLL AND STABILIZER

BACKGROUND OF THE INVENTION

Heretofore, in sorting bearings such as needle bearings or other round bearings they are allowed to slide down between two rotating cylinders whose axes are mounted in a diverging manner so as to provide a gradually enlarging gap between the cylinders.

As the bearings slide down the cylinders they drop through the point the width of the gap exceeds the diameter of the bearing. If the cylinders were perfectly cylindrical and could be driven while maintaining this desired gap there would be no problem in sorting bearings to accurate and high tolerances. However, it is substantially impossible to make a perfectly cylindrical cylinder or roll and, accordingly, while the variances may not be noticeable to the eye, when sorting bearings to high tolerances such as 10 millionths of an inch, any variance in the roundness of one or the other of the cylinder causes changes in the width of the sorting gap.

An example of a sorting device which solves many of these problems is disclosed in applicant's U.S. Pat. No. 4,172,527. The sorter disclosed in this patent permits sorting of bearings to tolerances of 0.000010 of an inch. However, it has been found that even with the sorter of this patent that temperature variations along the length of the cylinder will affect the sorting capacity of the sorter. It has been found that this temperature variation is the greatest when the sorter is initially started and continues for the first twenty four hours of operation. After twenty four hours it has been found that the temperature of the rolls stabilizes and the sorter sorts within the necessary tolerances.

In applicant's U.S. Pat. No. 4,128,282, is shown a counter balance bearing assembly for supporting the sorting cylinders of a sorting device such as that shown in applicant's Pat. No. 4,172,527, noted above. The bearing support disclosed in this patent is basically the same as that disclosed in applicant's Pat. No. 4,172,527. These bearings generate heat within the sorting roller or cylinder, which causes variations in the sorting gap between the cylinders and, therefore, affects the sorting accuracy of the sorting device.

SUMMARY OF THE INVENTION

The present invention improves the bearing sorting device of applicant's U.S. Pat. No. 4,172,527 by supporting the sorting cylinders in such a manner as to avoid the heat variation problems noted above. The supporting apparatus comprises bearing blocks for supporting the surfaces of said sorting cylinders on an air cushion which reduces the effect of friction between the cylinder surface and its bearing blocks and, at the same time, provides a cooling medium to cool or maintain a cool temperature in the surface of said cylinder.

The invention also includes self-aligning ball bearings for the supporting shafts of the sorting cylinders which permit lateral adjustment of the sorting cylinders and also slight vertical movement during the operation of the cylinders. The ball bearing assemblies are resiliently supported by a stabilizer which dampens and stabilizes the vertical movement of the self-aligning ball bearings.

The effect of these supports for the sorting cylinders and their supporting shafts is to permit the sorting device disclosed in applicant's U.S. Pat. No. 4,172,527 to sort round bearings accurately without a long start-up period.

Accordingly, it is an object of the present invention to provide a sorting apparatus for sorting round bearings to a high degree of sorting precision without a substantial warm-up period.

Another object of the present invention is to provide an apparatus which sorts bearings such as needle bearings at a very high rate and to very low tolerances.

These and other objects and advantages of the invention will become apparent upon reference to the following specification, the attendant claims, and the drawings.

BRIEF DESCRIPTION OF THE DRAWINGS

FIG. 1 is a schematic end view of the bearing support mechanism for one of the sorting cylinders;

FIG. 3 is an end view of the bearing blocks for supporting one of the sorting cylinders;

DETAILED DESCRIPTION OF THE INVENTION

Figure 2:
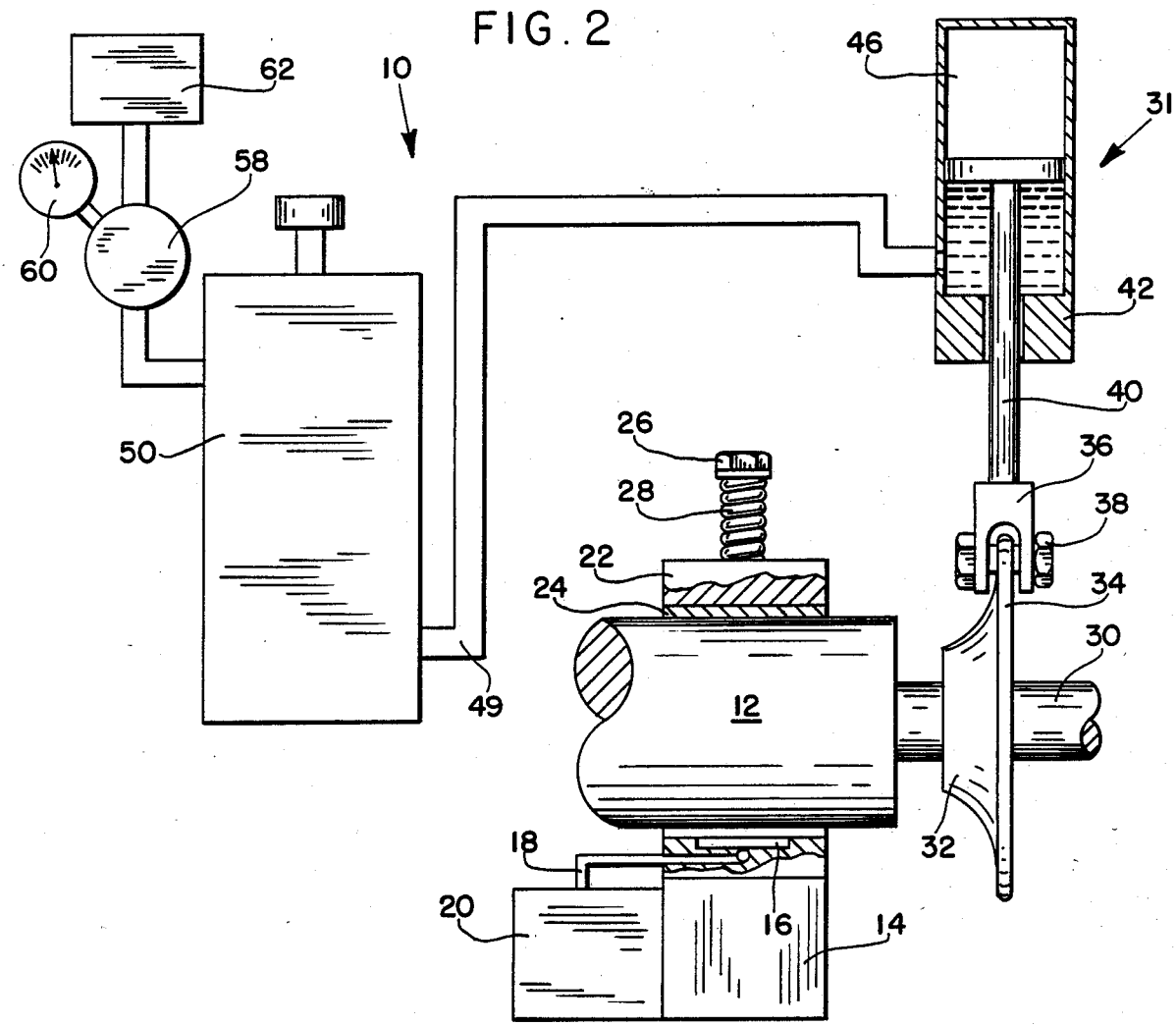
FIG. 2 is a schematic side view of the bearing supports for one of the sorting cylinders, in accordance with the invention.
Figure 4:
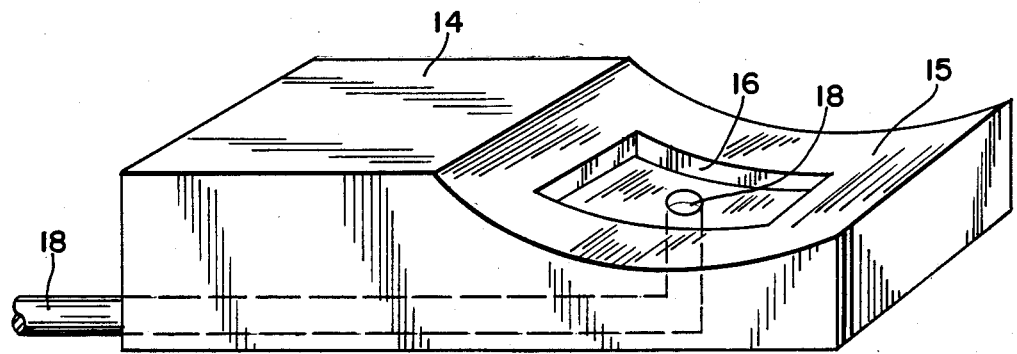
FIG. 4 is a perspective view of a lower bearing block for supporting the sorting cylinders.
Figure 5:
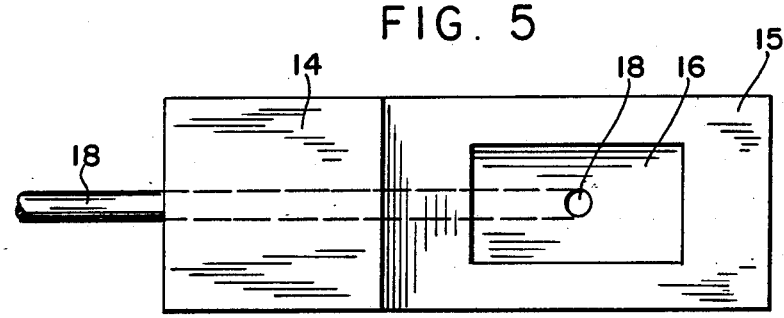
FIG. 5 is a plan view of the lower bearing block of the invention.

Referring now in more detail to FIGS. 1, 2, and 3 of the drawings, wherein it is illustrated a bearing assembly for supporting a sorting cylinder and its support shaft. Sorter 10 comprises a pair of sorting cylinders 12 as shown in more detail in applicant's U.S. Pat. No. 4,172,527. Each of these cylinders are supported at each end by a bearing support assembly such as that shown in FIGS. 1, 2, and 3. This assembly includes a lower bearing block 14 which has an arcuate curved surface formed around a diameter which is only slightly larger than the diameter of sorting cylinder 12. The curved surface 15 of the lower bearing block 14 has an arcuate pocket or outlet section 16 in the curved surface which serves as an outlet or opening for air under pressure which is received from the air line 18. Air line 18 conveys air under pressure from a source 20 to the lower bearing block.

When sorting cylinder 12 is in place in the lower bearing blocks 12 it will rest upon the curved surface 15. When air under pressure is supplied to opening 16 a thin air cushion is formed between the circumference of cylinder 12 and the curved surface 15 to permit cylinder 12 to rotate within the curved surface 15 without frictional contact between the surface of the cylinder and the curved surface 15. If the air supplied to opening 16 is under sufficient pressure it will lift the cylinder 12 off of the curved surface 15 to an extent which causes the air pressure to drop in opening 16. This drop in air pressure causes the cylinder 12 to come into contact with curved surface 15. Thus, if the air pressure is unbalanced, the cylinder 12 will be raised up and down causing a chatter when the surface of the cylinder strikes the curved surface.

Disposed opposite the lower bearing block 14 is an upper wiper block 22. Wiper block 22 is provided with a curved wiping surface 24 which generally has a inside curve which matches the circumference of the sorting cylinder. The upper wiper block 22 is bolted to lower bearing block 14 by means of one or more bolts 26 each of which is provided with a compression spring 28. Thus, upper wiper block 22 cleans the roll to keep dirt, ect., from the lower bearing block 14.

Each of the cylinders 12 is provided with a cylinder support shaft 30 which extends beyond the cylinder surface at each end thereof. Cylinder support shaft 30 is supported by a stabilizer 31 at each end of the cylinder 12. Stabilizer 31 comprises self-aligning ball bearings 32, through which extends support shaft 30. Bearings 32 are supported by a support ear 34 which is pivotally bolted to a stabilizer bracket 36 by means of a bolt 38. Stabilizer bracket 36 is connected to stabilizer rod 40 which extends through a horizontal frame member 42. Frame member 42 is supported by vertical frame members 41 to which frame member 42 is attached by means of bolts 43.

Stabilizer rod 40 is connected to a piston 44 which is contained in a pressurized cylinder 46. The lower portion of cylinder 46 is filled with a non-compressible fluid such as hydraulic fluid or oil 48 which is supplied to it through line 49 from pressure regulator 50. The upper part of cylinder 46 is filled with a compressible fluid or gas such as air which will permit limited vertical movement of piston 44 and rod 40 as the sorting cylinder 12 moves up and down in a vertical plane in response to the air pressure exerted on the lower part of cylinder 12 by means of bearing block 14.

This controls the vertical movement of the self aligning bearings in both the up and down directions.

The non-compressible fluid is supplied to the lower section of cylinder 46 from a pressure regulator 50 through line 49. Pressure regulator 50 has a pressure chamber 52 which is connected to a filler line 53 which is provided with a screw-on filler cap 54. The pressure regulator 50 is also provided with a pressure line 56 which connects the regulator to a source of air under pressure 62. In line 56 is a regulator valve 58 with a pressure gauge 60 which gauges the pressure of the air within line 56.

Within pressure chamber 52 in a check valve 64 which is urged against a curved seat, in the chamber to close filler line 53, by a coil spring 65. Connecting pressure chamber 52 and line 56 is a return capillary tube 66 which permits a limited flow of fluid back into line 56 whenever the pressure in the lower portion of cylinder 46 exceeds the pressure exerted by the source of pressurized air 62.

Figure 7:
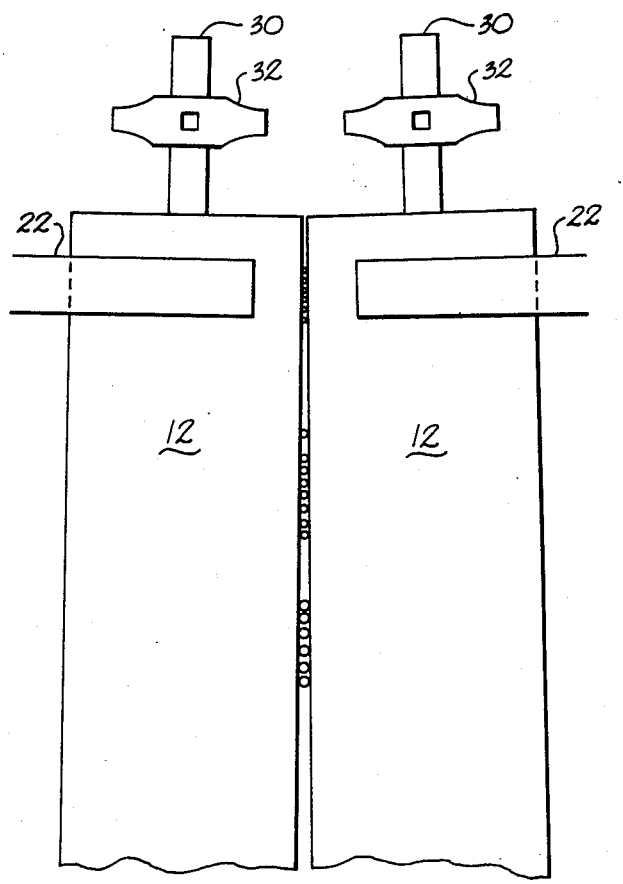
FIG. 7 is a plan view illustrating the bearings passing between a pair of cylindrical rollers and falling through a sorting gap.

FIG. 7 is a plan view illustrating a pair of cylinder rollers 12, each of which is supported at one end by a shaft 30 which in turn is supported by self aligning ball bearings 32. Each of the self aligning bearings 32 is supported by a stabilizer 31 which is not shown in this figure for sake of clarity.

In operation, the bearing supports for cylinders 12 of the invention operates as follows: Pressurized air from source 20 enters line 18 and through line 18 into the air opening 16 in the lower bearing block 14. The pressure of this air causes cylinder 12 to move upwardly permitting the air to escape from the opening 16 to interpose itself as a cushion between the curved surface 15 and the circumference of cylinder 12. This, in turn, moves piston 44 upwardly in cylinder 46 compressing the air trapped between the piston and the end of the cylinder. This causes a drop in the fluid pressure within the lower part of cylinder 46, line 49, and pressure chamber 52. When this happens check valve 64 in pressure chamber 52 is opened by the pressure of the fluid exerted by the pressurized air source 62 causing the non-compressible fluid 48 to move through filler line 53 into chamber 52 until the balance in pressure is restored. The flow through capillary tube 66 is very slow and is not a significant factor in restoring the pressure balance between pressure chamber 52 and line 55.

On the other hand, when cylinder 12 moves downwardly in the vertical plane, as for example, it is likely to do if the air pressure in opening 16 of the lower bearing block 14 raises the cylinder 12 far enough to lose the pressure under the cylinder. When this happens the weight of cylinder 12, which may be about 150–175 pounds, is such that the piston 44 moves downwardly within cylinder 46 to compress fluid 48 and to force it backwardly through line 49 into pressure chamber 52.

However, since check valve 64 is a one-way valve, the fluid cannot go through valve 52 into filler line 53. Instead, the fluid must return through capillary tube 66. The size of capillary tube 66 is selected so as to be substantially less than the size of line 55 and filler line 53 so that the piston 44 can move downwardly only at a much slower pace than it moved upwardly. This prevents the sudden dropping of cylinder 12 against the curved surface 15 whenever air pressure in opening 16 is lost by a greater upward movement than is necessary to support the cylinder 12. Thus, the problem of chatter caused by the cylinder 12 rising and falling into contact with curved surface 15 is avoided since the stabilizer only permits the roll to descend at a very slow rate and the air cushion is re-established before the circumference of cylinder 12 comes into contact with curved surface 15.

The portion 16 of the bearing block has a curvature which is slightly different from the curvature of surface 15 and is produced by feathering with a scraper. The deepest portion of the feathered portion 16 is only a few thousands of an inch. A single air inlet 18 extends through the feather portion 16. This form of bearing block 14 is used in the apparatus shown in FIGS. 1, 2, and 3.

Figure 6:
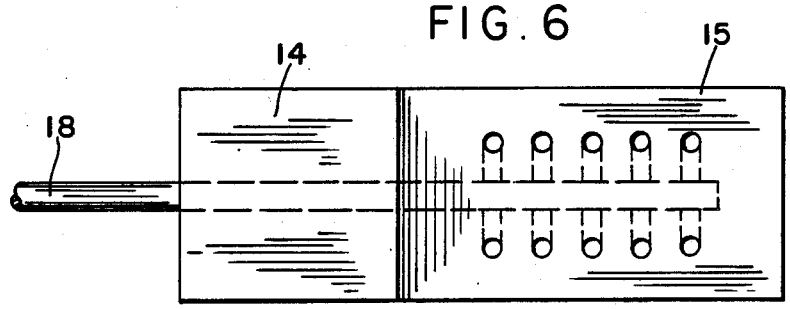
FIG. 6 is a plan view of an alternative form of the lower bearing block.

FIG. 6 illustrates an alternative configuration for the lower bearing block. In this embodiment instead of having a single opening 16, bearing block 14 has a series of small apertures 68 in curved surface 15. Each of the apertures 68 are connected to air line 18 by means of a branch line 70. When line 18 is connected to a source of compressed air a minute amount of air is expelled from each of openings 68 to form an air cushion between the circumferential surface of the sorting cylinder and curved surface 15.

When the sorter is equipped with the air bearings and the stabilizer it can effectively sort bearings within an hour of its start-up time. There is no need to wait a full twenty four hours for the sorting cylinders to attain their maximum operating temperature. The air cushion between the lower bearing blocks and the cylinder serve to cool the surface of the cylinder and to keep its operating temperature at a much lower and more constant level than has been maintained in the past. While a preferred embodiment of the invention has been described using specific terms, this description is for illustrative purposes only, and it is to be understood that changes in variations may be made without departing from the spirit or the scope of the following claims.

What is claimed is:

1. An apparatus for sorting round bearings according to their diameters, comprising:
    (a) a pair of elongated sorting cylinders, each of which is supported on a support shaft;
    (b) self-aligning bearings for supporting said support shafts for rotation about diverging longitudinal axes; and
    (c) pressurized fluid stabilizer means for resiliently supporting said self-aligning bearings for controlling vertical movement of said bearings, said pressurized fluid stabilizer means permitting said bearings to move upwardly at a rate which is greater than said bearings are permitted to move downwardly.

2. An apparatus for sorting round bearings as set forth in claim 1, wherein said self-aligning bearings are ball bearings.

3. An apparatus for sorting round bearings according to their diameters, comprising:
    (a) A pair of elongated sorting cylinders, each of which is supported on a support shaft;
    (b) self-aligning bearings for supporting said support shafts for rotation about diverging longitudinal axes; and
    (c) a stabilizer for resiliently supporting said self aligning bearings comprising a piston within a cylinder with fluid under pressure in said cylinder below the piston and air in said cylinder above said piston, said stabilizer means permitting said bearings to move upwardly at a rate which is greater than the rate said bearings are permitted to move downwardly.

4. An apparatus for sorting round bearings as set forth in claim 3, wherein means are provided for adjusting the pressure of said fluid within said cylinder.

5. An apparatus for sorting round bearings according to their diameter as set forth in claim 4, wherein said means for adjusting the pressure of said fluid comprises a source of air under pressure and a control valve.

6. An apparatus for sorting round bearings according to their diameters as set forth in claim 4, wherein said means for adjusting the pressure of said fluid comprises a pressure chamber full of said fluid and a one-way valve permitting said fluid to flow into said chamber at a predetermined rate whenever the fluid pressure outside of said chamber exceeds the pressure of the fluid within said chamber and within said cylinder.

7. An apparatus for sorting round bearings according to their diameters as set forth in claim 6, wherein a capillary tube means is provided for permitting fluid within said pressure chamber to return to the supply tube for said chamber but at a rate which is substantially less than the rate said fluid was fed into said chamber.

8. An apparatus for sorting round bearings according to their diameters, comprising:
    (a) a pair of elongated sorting cylinders, each of which is driven by support shafts for rotation about diverging longitudinal axes;
    (b) a lower bearing block for supporting each of said sorting cylinders having a curved surface with an inner curvature slightly larger than the circumference of the cylinder it supports and which extends about a lower portion of said cylinder, said curved surface having an opening for receiving air under pressure and for directing it between said surface and the circumference of said cylinder;
    (c) an upper bearing block for each of said sorting cylinders, having a curved bearing surface with an inner curvature slightly larger than the circumference of its cylinder for retaining said cylinder in a pre-determined position;
    (d) means for supplying air under pressure to said opening in said lower bearing blocks, whereby a cushion of air supports the surfaces of said cylinders for rotation without substantial friction;
    (e) self-aligning bearings for said support shafts; and
    (f) pressurized fluid stabilizer means for resiliently supporting said self-aligning bearings for controlling limited vertical movement of said bearings, said stabilizing means permitting said bearings to move upwardly at a rate greater than said bearings are permitted to move downwardly, thereby avoiding repetitive contact between said lower bearing blocks and the surface of said sorting cylinders.

9. An apparatus for sorting round bearings as set forth in claim 8, wherein said self-aligning bearings are ball bearings.

10. An apparatus for sorting round bearings according to their diameters, comprising:
    (a) A pair of elongated sorting cylinders, each of which is driven by support shafts for rotation about diverging longitudinal axes;
    (b) a lower bearing block for supporting each of said sorting cylinders having a curved surface with an inner curvature slightly larger than the circumference of the cylinder it supports and which extends about a lower portion of said cylinder, said curved surface having an opening for receiving air under pressure and for directing it between said surface and the circumference of said cylinder;
    (c) an upper bearing block for each of said sorting cylinders, having a curved bearing surface with an inner curvature slightly larger than the circumference of its cylinder for retaining said cylinder in a predetermined position;
    (d) means for supplying air under pressure to said opening in said lower bearing blocks, whereby a cushion of air supports the surfaces of said cylinders for rotation without substantial friction;
    (e) self-aligning bearings for said support shafts; and
    (f) a stabilizer for resiliently supporting said self aligning bearings comprising a piston within a cylinder with fluid under pressure in said cylinder below the piston and air in said cylinder above said piston, said stabilizer means permitting said bearings to move upwardly at a rate which is greater than the rate said bearings are permitted to move downwardly.

11. An apparatus for sorting round bearings as set forth in claim 10, wherein means are provided for adjusting the pressure of said fluid within said cylinder.

12. An apparatus for sorting round bearings according to their diameters as set forth in claim 11, wherein said means for adjusting the pressure of said fluid comprises a pressure chamber full of said fluid and a one-way valve permitting said fluid to flow into said chamber at a predetermined rate whenever the fluid pressure outside of said chamber exceeds the pressure of the fluid within said chamber and within said cylinder.

13. An apparatus for sorting round bearings according to their diameters as set forth in claim 12, wherein a capillary tube means is provided for permitting fluid within said pressure chamber to return to the supply tube for said chamber but at a rate which is substantially less than the rate said fluid was fed into said chamber.

14. An apparatus for sorting round bearings according to their diameter as set forth in claim 13, wherein said means for adjusting the pressure of said fluid comprises a source of air under pressure and a control valve.

15. An apparatus for sorting round bearings according to their diameters, comprising:
   (a) a pair of elongated sorting cylinders, each of which is supported on a support shaft;
   (b) self-aligning bearings for supporting said support shaft for rotation about diverging rotational axes; and
   (c) stabilizer means having resilient means which resist vertical movement of said bearings in the upward and the downward direction, said resilient means permitting said bearings to move upwardly at a rate which is greater than said resilient means permits said bearings to move downwardly.

16. An apparatus for sorting round bearings as set forth in claim 15, wherein said resilient means and said stabilizer means comprises fluid under pressure.

* * * * *